United States Patent
Deegan et al.

(10) Patent No.: US 9,611,520 B2
(45) Date of Patent: Apr. 4, 2017

(54) BASE METAL RECOVERY

(71) Applicant: TETRONICS (INTERNATIONAL) LIMITED, Swindon (GB)

(72) Inventors: David Deegan, Swindon (GB); Matthew Slinn, Swindon (GB)

(73) Assignee: Tetronics (International) Limited, Swindon (GB)

( * ) Notice: Subject to any disclaimer, the term of this patent is extended or adjusted under 35 U.S.C. 154(b) by 250 days.

(21) Appl. No.: 14/364,916

(22) PCT Filed: Dec. 12, 2012

(86) PCT No.: PCT/GB2012/053101
§ 371 (c)(1),
(2) Date: Jun. 12, 2014

(87) PCT Pub. No.: WO2013/088137
PCT Pub. Date: Jun. 20, 2013

(65) Prior Publication Data
US 2014/0318312 A1    Oct. 30, 2014

(30) Foreign Application Priority Data
Dec. 12, 2011  (GB) .................................. 1121375.8

(51) Int. Cl.
*C22B 7/00*    (2006.01)
*C22B 4/00*    (2006.01)
*C22B 4/08*    (2006.01)

(52) U.S. Cl.
CPC ................ *C22B 4/005* (2013.01); *C22B 4/08* (2013.01); *C22B 7/001* (2013.01); *Y02P 10/214* (2015.11)

(58) Field of Classification Search
CPC ............ C22B 7/001; C22B 4/005; C22B 4/08
See application file for complete search history.

(56) References Cited

U.S. PATENT DOCUMENTS 4,361,441 A * 11/1982 Tylko ...................... C22B 4/005
                                                    219/121.36
4,428,768 A *  1/1984 Day ........................ C22B 9/226
                                                      75/10.19

(Continued)

FOREIGN PATENT DOCUMENTS

EP    0173425    3/1986
GB    2465603    5/2010

(Continued)

OTHER PUBLICATIONS

International Search Report and Written Opinion, PCT/GB2012/053101, dated Mar. 14, 2013, 11 pages.

(Continued)

*Primary Examiner* — George Wyszomierski
*Assistant Examiner* — Tima M McGuthry Banks
(74) *Attorney, Agent, or Firm* — Senniger Powers LLP

(57) ABSTRACT

A method for plasma treatment of wet metal-containing wastes in which a plasma treatment unit comprises an electrically conductive hearth for holding a layer of slag and optionally a layer of metal produced by the plasma treatment. A graphite electrode is arranged above the hearth, so that, in use, a plasma arc is formed between the electrode and the hearth. One or more inlets for the particulate metal-containing waste are arranged adjacent to the electrode and sufficiently close to the electrode so that, in use, the particulate metal-containing waste fed into the plasma treatment unit falls close to the arc formed between the electrode and the hearth and is heated by the plasma arc before contacting the slag layer such that moisture present in the particulate metal-containing waste is completely volatilized in a head space of the furnace.

25 Claims, 3 Drawing Sheets

(56) References Cited

U.S. PATENT DOCUMENTS

| | | | |
|---|---|---|---|
| 4,518,417 A | 5/1985 | Lugscheider et al. | |
| 4,571,259 A * | 2/1986 | Fey | C22B 4/005 |
| | | | 266/148 |
| 4,685,963 A * | 8/1987 | Saville | C22B 1/00 |
| | | | 75/10.19 |
| 4,756,748 A * | 7/1988 | Lu | C10B 7/10 |
| | | | 75/10.19 |
| 5,368,627 A | 11/1994 | Cowx | |
| 5,756,957 A * | 5/1998 | Titus | A62D 3/19 |
| | | | 110/250 |
| 5,766,303 A * | 6/1998 | Bitler | A62D 3/19 |
| | | | 405/128.65 |
| 5,942,023 A | 8/1999 | Bitler et al. | |

FOREIGN PATENT DOCUMENTS

| | | |
|---|---|---|
| JP | 2002060860 | 2/2002 |
| WO | 9749641 | 12/1997 |

OTHER PUBLICATIONS

Abstract of JP2002060860; Feb. 28, 2002.
Search Report, Great Britain Application No. GB1121375.8, dated Apr. 12, 2012, 2 pages.

* cited by examiner

BASE METAL RECOVERY

REFERENCE TO RELATED APPLICATIONS

This application is a U.S. national stage application of International Patent Application No. PCT/GB2012/053101, filed Dec. 12, 2012, and claims the benefit of priority of Great Britain Application No. 1121375.8, filed Dec. 12, 2011, the entire disclosures of which are incorporated herein by reference.

FIELD OF THE INVENTION

The present invention relates to a method for the refining of powdered ores, mine tailing and other metal-containing wastes in a furnace without the need for complex pretreatment. In particular, the method provides for the efficient and safe thermal treatment of a metal-containing waste through the use of a plasma treatment unit.

The mining and metal refining industries produce fine powder wastes, called tailings, and metal bearing sludges which are not compatible with conventional processing techniques. Conventional techniques include gas-fired furnaces (rotary kiln and rotary hearth furnaces) and submerged arc furnaces. The materials are therefore often landfilled or stockpiled, which represents large financial losses and a significant impact on the environment.

Rotary kiln and rotary hearth furnaces have the disadvantage of requiring a high gas flow rate due to the need for fossil fuels and oxidant gases such as air or oxygen. These high gas flow rates result from the combustion required to heat the furnace. The high flow rates also cause particle entrainment, especially with fine particle ores. As a result of this, much of the feed will bypass or short circuit the furnace. This means that the recovery efficiency is lower than desired and there is an additional burden on the off-gas purification system (for example, the bag house) which deals with the gas-entrained particles. A secondary disadvantage of gas fired furnaces is that the temperature cannot be controlled separately from the chemistry of the process. During operation of gas-fired furnaces the requirement for combustion gases limits the degree of achievable reduction occurring within the furnace. As a consequence of the foregoing, such furnaces are effectively limited to making directly reduced iron from briquetted feeds.

In submerged arc furnaces (SAFs) electrodes are dipped below the slag/feed level and an electrical arc runs between the electrodes, through the slag/feed. Water in the feed will vaporize to steam in the presence of the arc. Vaporization of water under the surface of the feed leads to fast expansion/explosion which can be dangerous. The violent action of the submerged arc tends to force a portion of the fine particles out of the melt which fouls the slag and/or equipment (especially the off-gas systems). It is known to address some of these problems by adding a pretreatment process such as drying, briquetting or pelletizing to the feedstock material. However, this adds significant cost and time.

In addition, SAF operation is dependent upon the slag resistivity which changes with temperature, density, void space and composition. This can limit the process chemistry and cause delays during startup. SAFs generally use alternating current and usually have three electrodes for the three phase electrical power. The electrodes are consumed quickly through interaction with the slag and erratic arc movement. The electrodes are large but have to be changed frequently due to high electrode wear rates. Furthermore, the SAF configuration tends to result in hot and cold spots in the treated feed which prevents reactions approaching equilibrium, prevents complete reaction in the slag and leads to faster wear of the refractory.

U.S. Pat. No. 4,518,417 discloses a plasma treatment apparatus for reducing oxide-containing fine-particle ores. The ore and reductant are introduced tangentially through the sides of the furnace to create a cyclonic motion. This is said to maximize the exposure of the particles to the plasma source, but would lead to significant carry-over of particles as well as cooling and blockage problems. Additionally, exposure of the water-cooled feed lances to the heat of the plasma furnace would make the lances susceptible to failure, forcing the furnace operation to shut down. The tap holes allow the furnace gases to leak out and air to ingress into the furnace. This will adversely affect the process chemistry, technical metal recovery rates and/or release toxic carbon monoxide gases.

The feed materials used in the method of U.S. Pat. No. 4,518,417 are all pre-dried. Similar processes are described in EP0173425, U.S. Pat. No. 4,571,259 and GB2465603.

WO97/49641 relates to a method for the treatment of a hazardous and/or radioactive waste. In view of the feedstock, the process is run in a batchwise manner without an overflow. The aim of the process is to melt and vitrify the feedstock material, rather than to retrieve a commercially useful product.

SUMMARY OF THE INVENTION

Accordingly there is a desired for a method and apparatus that mitigate at least some of the problems associated with the prior art or that at least provides a commercially useful alternative thereto.

Accordingly, in a first aspect the present invention provides a method for the treatment of metal-containing waste, the method comprising:
  (i) introducing a particulate metal-containing waste into a plasma treatment unit;
  (ii) plasma treating the particulate metal-containing waste to form a layer of slag and, optionally, a layer of metal beneath the layer of slag; and
  (iii) recovering slag and/or metal from the plasma treatment unit;
wherein the plasma treatment unit comprises an electrically conductive hearth for holding the layer of slag and optional layer of metal, one or more inlets for the particulate metal-containing waste arranged above the hearth, and an electrode arranged above the hearth so that, in use, a plasma arc is formed between the electrode and the hearth, and
wherein the one or more inlets for the particulate metal-containing waste are arranged so that, in use, the particulate metal-containing waste introduced into the plasma treatment unit is heated by the plasma arc before contacting the slag layer.

DETAILED DESCRIPTION OF PREFERRED EMBODIMENTS

Figure 1:
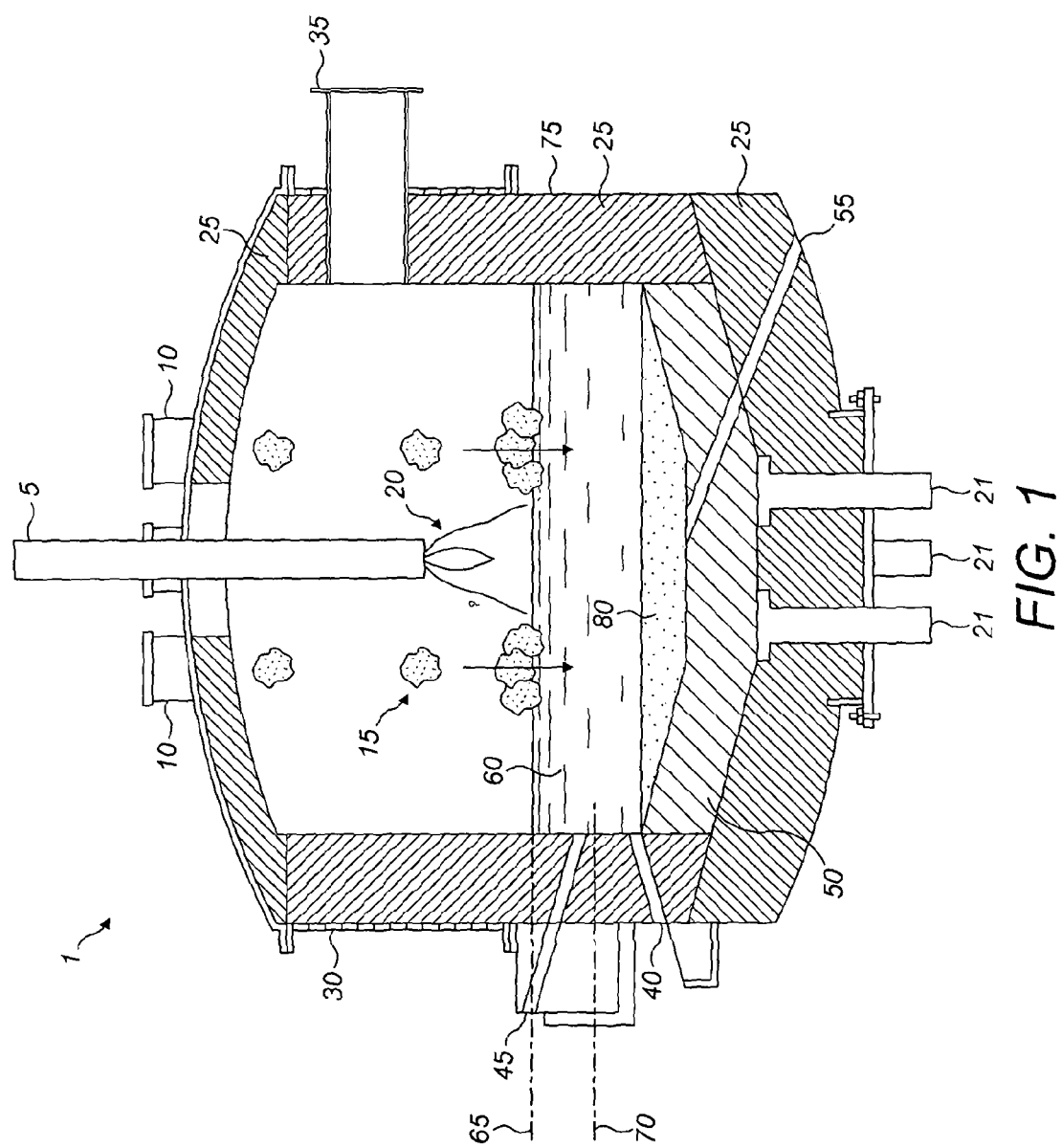
FIG. 1 shows a schematic representation of a suitable plasma treatment unit for carrying out the method of the present invention.

In the following passages different aspects/embodiments are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention relates to a method of refining oxide-containing fine particle wastes such as ores, preferably under chemically reducing conditions, to create useful products. The products will always include molten slag and a gas phase, but sometimes a separate molten metal phase as well. The refining occurs either by concentrating a valued component into a distinct phase(s) and/or cleaning an undesirable component from a desirable phase. The oxide-containing ore particles are melted and sometimes reduced in a refractory lined melting vessel (a hearth), preferably in the presence of a carbon-containing reductant, by the action of a transferred arc plasma electrode.

Moreover, the present invention provides a smelting process where a fine particulate waste or metal oxide is melted, reduced and separated in a single step. Advantageously the smelting process can use any fine particle ore, sludge or metal oxide and does not require briquetting before feeding. The ore is preferably blended with reductant and, optionally, also with fluxing materials as required. It is then feed in through the roof of a plasma furnace using a feeding mechanism. The feed will partially react in the head space in the presence of the arc where the water is vaporized. Gas flow is low so particle entrainment in the off-gas is low, usually less than 2% of feed partition in this way. The feed then lands on the molten surface of the melt pool where it is exposed to further heat from the arc (hot top operation). The feed will partly or wholly react under reducing conditions into products and be assimilated into the melt.

The present invention provides a continuous process for the treatment of sludges of particulate material. That is, the configuration of the electrodes and feed system has been found to be ideally suited for the treatment of sludges because the system can cope well with a wet feedstock material, compared to the known prior art methods, and does not encourage significant loss of material to the off-gas system. Furthermore, the reductant and/or flux is preferably pre-blended with the feedstock for the ease of processing. The ability to treat wet sludges allows for process simplification and lower operations costs because a separate pre-drying step is not required.

During the processing the metal layer will preferably be a molten metal layer. This allows for the metal to be refined by the heating and allow for easy tapping of the metal from the treatment vessel. The slag layer will also preferably be molten when the arc contacts the vessel contents. This is a so-called "hot-top" operation.

The present inventors have provided a system ideally suited for the recovery of useful materials from a particulate metal-containing waste. The feed system and low gas flow rate mean that fine particles can be processed. As a consequence, particle carryover is very low, typically 1-2%, and complex pretreatments are not required. Furthermore, the furnace configuration is tolerant to water because it vaporizes in the head space, unlike in a submerged arc furnaces where it can vaporize in the slag layer and cause steam pressurization and consequential explosion. Preferably, the water and any other volatile species present in the metal-containing waste, the slag layer and/or the metal layer are passed to an off-gas system The particulate metal-containing waste is a fine particulate material including one or more metallic elements, most commonly in the form of a metal oxide or the like. The ores and metal oxides to be treated by the present invention are not limited to those in the specific examples given below but include oxide ores and oxides of titanium, chromium, manganese etc. as well as sulfide ores containing iron, nickel and copper. The ores to be treated include but are not limited to crude ores, concentrates, wastes, treated products and sweeps. The particulate metal-containing waste preferably includes mine tailings or particulate ore.

Due to their fine size, such materials tend to be uneconomic to process using conventional techniques due to the problems discussed above. The particulate metal-containing waste may be in the form of a substantially dry powder, granules or in the form of sludge. Sludges are preferred due to the particular suitability of the present process for handling "wet" materials. Such sludges cannot readily be processed by conventional techniques. Sludges will preferably be aqueous sludges. However, sludges may comprise organic liquids. Preferably sludges are subjected to dewatering prior to treatment to avoid inefficient use or reductants and electrical power. By sludge it is, of course, meant a semisolid material comprising the particulate material and is considered a term in the art.

The waste may also include or be blended with at least one of a reductant and a flux material. Preferably the waste is blended with a flux and at least one reductant. preferably these further components are also in particulate form. The former can be used to obtain a metal product in the hearth, separate from the slag. The latter helps to control and manipulate the slag consistence and form. Suitable flux materials are well known and include, for example, $Al_2O_3$, CaO and $SiO_2$. The required amounts of flux and reductant can be readily tailored to the specific waste being treated.

The reductant is preferably a solid reductant material. It is preferably introduced with the metal-containing waste into the plasma treatment unit and may be blended therewith before introduction. Suitable reductants are preferably carbonaceous materials, such as charcoal or materials with high fixed carbon contents. Alternatively, metals may be selected depending on the waste material being treated. The reductant is preferably provided in powder form and preferably has substantially the same particle size as the particulate metal-containing waste. In another embodiment, the reductant may be a gaseous reductant, preferably methane.

The particulate metal containing waste preferably has a mean longest particle diameter of less than 10 mm, more preferably less than 5 mm, and more preferably less than 0.5 mm. The most preferred particles are less than 1 mm. The particles are preferably on average at least 0.001 mm. This can be measured using an optical microscope.

Preferably the waste includes at least 10 ppm recoverable metal. More preferably the waste contains at least 100 ppm and more preferably from 100 to 100,000 ppm of recoverable metal. The process is able to handle higher-content materials and, as will be appreciated, the higher the metal content the higher the potential yield.

The one or more inlets for the particulate metal-containing waste are arranged adjacent the second electrode so that, in use, the particulate metal-containing waste is heated by a plasma arc formed between the electrode and the electrically conductive hearth (which forms a counter-electrode). That is, the inlets are arranged sufficiently close to the electrode such that the powder falls close to the arc formed between the electrode and the hearth. This results in a strong preheating of the material before it enters the melt-pool. This heating preferably causes the complete volatilization of any moisture present in the feedstock material. As a consequence, there is minimal moisture present in the melt-pool and the disadvantages associated with SAF can be avoided.

Preferably the method further comprises refining the slag to obtain a metal oxide and/or refining the metal to obtain one or more metals or alloys. The slag and/or metal may be cast onto a casting table to cool. This allows for the formation of a thin (preferably less than 3 cm, more preferably less than 1 cm) brittle sheet that may be fractured and subjected to known recovery techniques. Such techniques include eddy current recovery, magnetic recovery and the like. The sheet may be fragmented by any known technique and, if suitably sized following fragmentation, may be recycled back into the process. Alternatively, monolithic ingots can be cast from the materials for subsequent processing.

Preferably at least a portion of the slag material may be recycled into the plasma treatment unit. This allows for a higher recovery yield from the raw feedstock material.

Preferably the slag is recovered from the slag layer through an outlet upwardly inclined from the hearth wall and located below the surface of the slag layer. The channel is configured so as to not penetrate into the lower metal layer. The use of such a slag outlet prevents the short-circuiting of the hearth (furnace chamber) by any gaseous or gas-entrained species. The gaseous or gas-entrained species are hence prevented from exiting the reaction chamber by the body of the slag. This also increases the distance the feed has to take to exit the furnace (plug flow) and prevents feed short circuiting during continuous operation. This also allows for separate slag and metal tapping if required after an engineered furnace residence time. Furthermore, the upwardly inclined channel results in a known and controllable melt height within the furnace and, therefore, improved stability or operating conditions.

Preferably the method is a continuous process. That is, the slag is tapped off by continuous over-flow. The metal layer, if present, can be removed in batches, once sufficient metal has accumulated. Preferably at least a metal heel, i.e. an amount of molten metal, is maintained in contact with the hearth. This prevents corrosive wear of the hearth material and acts as a protective barrier. By having the return path for the current through a permanent liquid metal pool contained by the conductive hearth of the furnace, which is in electrical contact with several large current collectors/electrodes, the hearth and electrodes are protected from the arc and high localized current densities and the furnace's inner environment. This avoids the electrodes from melting and alloying with the melt pool.

Preferably the particulate metal-containing waste is gravity fed into the plasma treatment unit. That is, the powder is preferably allowed to fall into the plasma treatment unit without being entrained in a gas jet or the like. This helps to minimize the gas disruption in the vessel and reduces the undesirable entrainment of any particulate matter into the off-gas system. As will be appreciated, the presence of any particulate material in the off-gas system can cause clogging of the filters and also lead to the loss of valuable material. Thus the feed inlets are preferably in the roof of the reaction furnace and located in close proximity to a primary electrode.

The plasma treatment unit comprises at least an electrode and a counter electrode. The counter-electrode is provided by the electrically conductive hearth. These are configured so that, in use, an electrical arc can be formed between the electrodes, passing through the feedstock material. This leads to very intense heating of the material. Furthermore, the configuration can produce convection currents in the solid material being treated which significantly reduces the warm-up times.

The plasma treatment is preferably carried out at a global furnace temperature of at least 1100° C. Preferably the temperature is from 1400 to 2500° C. and more preferably from 1400 to 1600° C. These elevated temperatures allow for fast processing with suitably brief residence times for the processed material.

In the apparatus used in the present method, inner surface of the hearth forms an electrode. In this configuration the hearth may be termed the return electrode. There may be a conventional electrode in electrical connection with the hearth to form this counter electrode. The primary electrode is located above the hearth. The primary electrode may be manipulated to increase/decrease the separation of the electrodes. This is helpful to initiate a plasma arc. Preferably the primary electrode is formed of graphite.

Two or more electrodes may be disposed in or form part of the hearth, so that in operation, the arc can pass from the primary to either of these electrodes. This configuration has been found by the present inventors to have improved uniformity of power distribution and electrical contact than, say, a configuration in which two electrodes positioned above the hearth (which does not act as an electrode) are used in a transferred arc mode, although such a configuration may be used if desired.

Preferably the plasma treatment is carried out in a reducing atmosphere. Preferably the atmosphere is oxygen-depleted. That is, the atmosphere has less than 1% by volume, more preferably less than 0.1% and most preferably essential no oxygen present (i.e. a very low partial pressure). The use of an oxygen depleted atmosphere allows the reduction of metal present in the feedstock (reductant and waste) to produce a metal product.

Preferably the hearth is indirectly water cooled. This helps to maintain a protective layer of material next to the surface of the hearth to protect the hearth from corrosion. It is preferably formed of a refractory material to be hard wearing and capable of surviving the high temperatures and corrosive conditions. Furthermore, the hearth is provided with an electrically conductive inner surface.

According to a second aspect there is provided an apparatus for the treatment of metal-containing waste, the apparatus comprising:

a plasma treatment unit comprising an electrically conductive hearth for holding a metal layer and an overlying slag layer, one or more inlets for a particulate metal-containing waste arranged above the hearth, an electrode arranged above the hearth so that, in use, a plasma arc can be formed between the hearth and the electrode, and wherein the one or more inlets for the particulate metal-containing waste are arranged adjacent to the electrode so that, in use, the particulate metal-containing waste is heated by the plasma arc, wherein the electrode is movable to adjust the separation of the electrode from the hearth;

the apparatus further comprising grinding and/or sorting means for providing a particulate metal-containing waste for introduction into the plasma treatment unit via the one or more inlets.

The electrode is preferably adjustable vertically, so that it can be raised and lowered relative to the hearth. Although only one electrode is required, it will be appreciated that one or more electrodes may be provided above the hearth. Moreover, the hearth may form the counter-electrode or may be in electric communication with one or more counter-electrodes.

The apparatus preferably further comprises means for providing a negative pressure within the plasma treatment unit, in particular, within the treatment zone. The plasma treatment unit, and in particular the treatment zone, are preferably kept sealed when in use.

In FIG. 1 there is shown a furnace 1. The furnace 1 is provided with a primary electrode or torch 5. The furnace 1 includes several feed ports 10 located around the primary electrode 5 so that, in use, feed 15 fed into the furnace 1 falls close to a plasma arc 20 formed indirectly between the primary electrode 5 and the secondary electrodes 21. The furnace 1 is lined with refractory 25, has water cooling 30 and an off-gas duct 35. The further noteable components include: a metal tap hole 40; an underflow/overflow taphole 45; a graphite crucible 50 thermally insulating the electrically conducting hearth; and a service taphole 55. In use, there is slag 60 in the furnace 1 having a stable slag overflow level 65. In use, there is metal layer 70 in the furnace 1 and there is a retained metal heel 80 to protect the graphite crucible 50. The furnace 1 has a steel shell 75.

Figure 2:
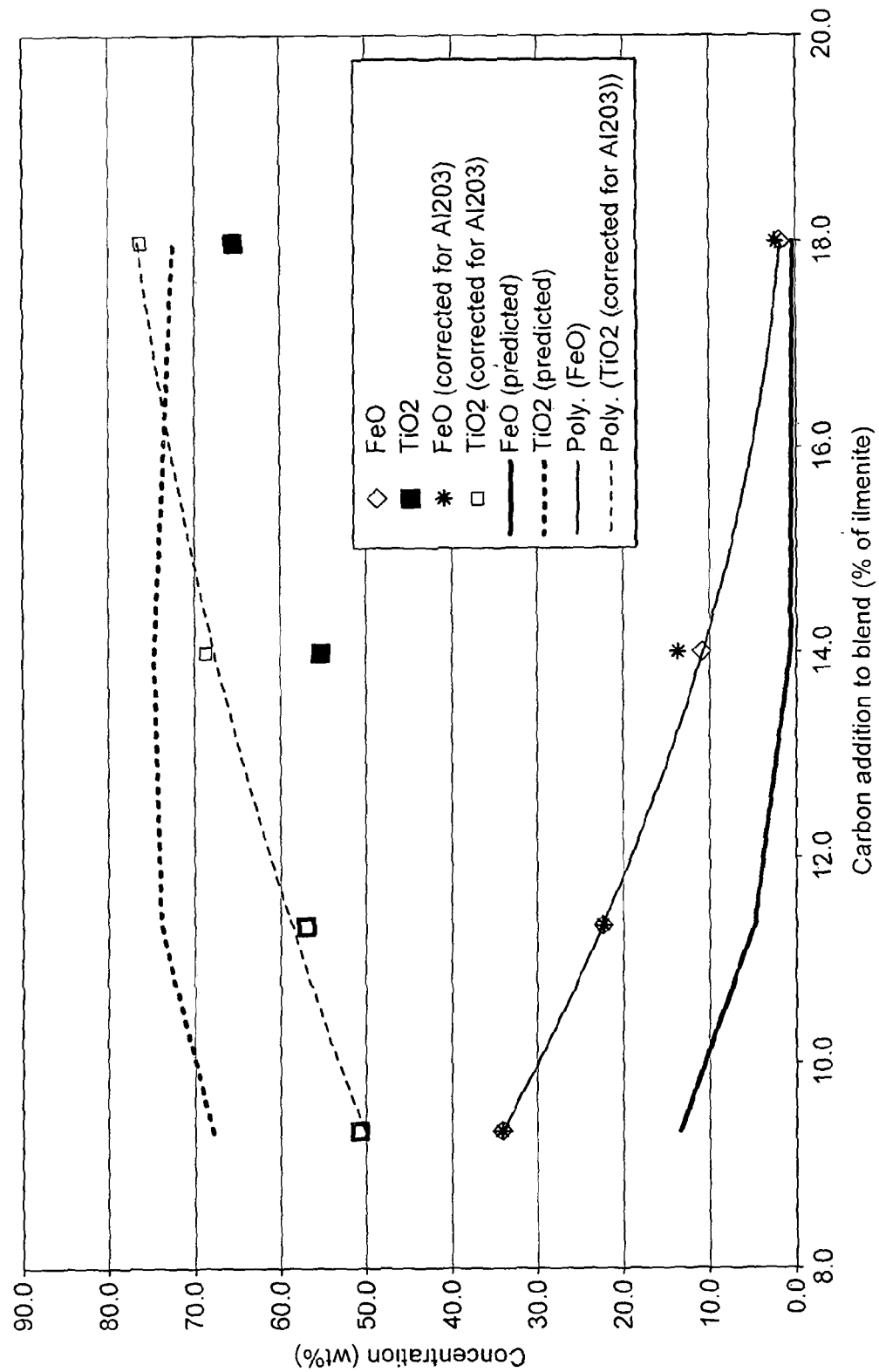
FIG. 2 shows actual and predicted concentrations of TiO2 and FeO in the product when using different amounts of carbon reductant.

FIG. 2 shows slag product concentration of $TiO_2$ and $Fe_2O_3$ at differing carbon concentrations. The results are derived from the slag analysis of four trials with best fit lines and thermodynamic prediction lines for comparison. It is clear that there is a substantial difference between the theory and the actual trial results. In FIG. 2, the axes are carbon addition to the blend (% of ilmenite) on the x-axis and concentration (wt %) on the y-axis. The lowermost data line, starting at a concentration of about 13 wt % is the predicted FeO concentration. The actual results for FeO are plotted as diamonds on the line starting at about 34 wt %. The plotted diamonds match closely to the values corrected for Al2O3, except at 14% carbon addition, where the star plot point does not overlap the diamond plot point. The uppermost data line, starting at a concentration of about 67 wt % is the predicted $TiO_2$ concentration. The actual results for $TiO_2$ are plotted as squares (with data points at, for example, 14 wt % carbon and 56 wt %). The values corrected for Al2O3 are shown as hollow squares and have been provided with a best fit line starting at 50 wt %.

Figure 3:
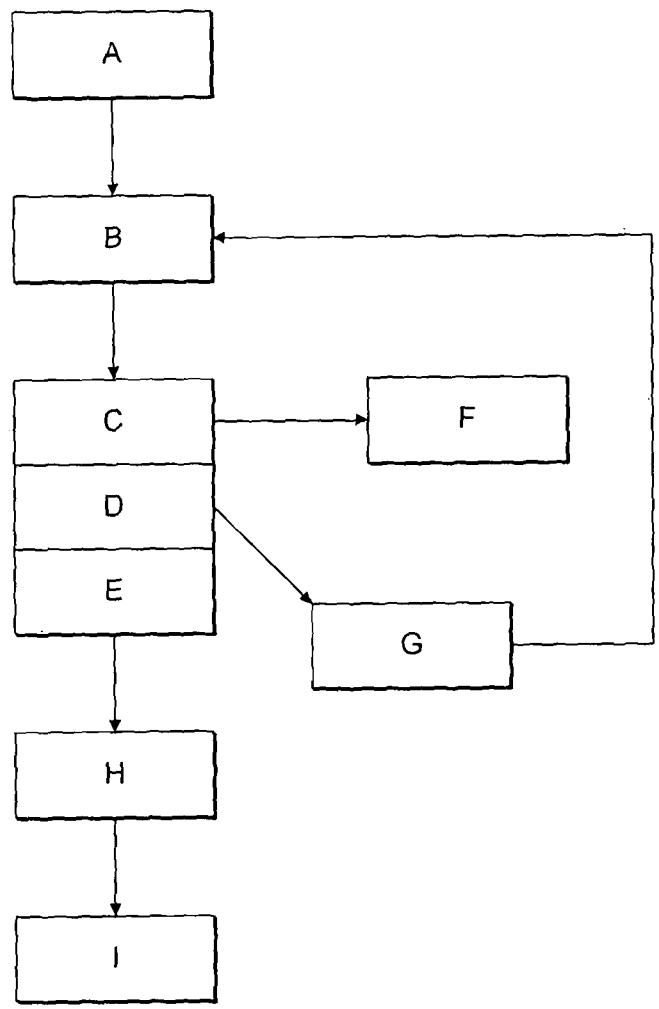
FIG. 3 shows a flow chart detailing the key steps of the method of the present invention.

FIG. 3 shows a flowchart of the key steps of the method of the present invention. In step A a particulate feedstock is fed into the reaction furnace B and treated with plasma. The feedstock forms an offgas C, a slag layer D and a metal layer E. The offgas C is fed to an off-gas treatment unit. The slag layer D may be recycled into the process as part of the feedstock. The metal layer E can be extracted and refined in step H to produce a pure metal product I.

The invention will now be described further in relation to the following non-limiting examples.

An example of the apparatus is shown in FIG. 1. The process takes place in a refractory lined (D), transferred arc plasma furnace (see FIG. 1) with a graphite electrode or plasma torch (C) operating on inert, gas usually nitrogen. The second electrode is attached to a refractory conductive hearth (H) structure which holds a liquid metal electrode. External indirect water cooling (E) is usually required for refractory protection and also to ensure the stability of the electrode or torch, the feeder and the bottom electrode. This provides for safety, longer refractory life, higher heat flux density and feeding density. The electrode or torch can be manipulated up and down to alter the arc length during normal operation and also to allow for arc ignition at the start of operation. The electrode may also be angled and rotated to evenly disperse the melting energy. The Direct Current (D.C.) power generating the arc is provided with only one primary electrode. Electrode or plasma torch components are designed to allow easy replacement or replenishment during furnace operation for reliability and endurance. A robot or manipulator is used to remotely handle the electrode/torch. An off-gas system is required to treat the gases from the furnace (A) before ultimate emissions are released to atmosphere. This consists of conventional equipment, usually burners, particulate filters and liquid or solid sorbent based scrubbers and a stack/chimney.

The ore is usually blended with carbon reductant and sometimes fluxing agents and fed in from the roof using a feed system which usually consists of screw conveyors, gravity feeders and Loss-in-Weight (LiW) feed systems. The ore enters the furnace (1) and partially reacts in the head space, water evaporates here. The feed falls onto the melt pool (2) where it is converted through reactions driven by the plasma energy into products. Separation of the products in the melt pool occurs by density difference. The metal partitions and forms a lower layer and the retained oxides become part of the upper slag layer, Similar can occur for sulphide ores however here a matte and slag layer are formed. The underflow/overflow taphole design (G) allows for continuous slag release and removal whilst preventing the feed short circuiting the furnace, i.e. it is held at temperature for a predefined residence time within the furnace. The slag drain point is located at the bottom of the slag layer so the feed has to travel down to exit the furnace and by this stage will have reacted and separated into a discrete lower metallic layer and upper ceramic layer, thus preventing feed by-pass. The metal percolates and accumulates at the base of the furnace. Once sufficient metal has accumulated it can be taped separately from the slag overflow, or together with the main mass of slag, then subsequently separated outside the furnace during downstream processing. The metal tap hole is not located at the lowest point in the furnace so that the furnace does not tap 'dry' and a pool of liquid metal is retained to protect the conductive hearth from the arc. The conductive refractory protects the electrodes from direct contact with the melt pool and spreads out the heat which would otherwise cause melting/erosion of the refractory and electrode. The conductive refractory is made of separate conductive refractory bricks, usually graphite or carbon impregnated material, assembled to form a dished shape. A third service tap hole is located at the lowest point to enable infrequent emptying of the metal pool for inspection and maintenance of the refractory hearth. Recovering the products occurs by oxygen lancing through the tap hole ports. The slag flows out of the underflow-overflow port (4). The products are collected in refractory lined metal pots.

Example 1

Smelting Ilmenite Fines ($TiFeO_3$) for Extraction of $TiO_2$ and Iron

An example of the application of this invention is in the carbothermic reduction of ilmenite ore fines ($TiFeO_3$) to iron metal and titanium dioxide rich slag. Ilmenite ore (composition in Table 1) is blended with carbon in a ratio of about 14 kg carbon per 100 kg ilmenite in either a continuous or batch process. This is then fed in through the roof of the plasma furnace using the feeder apparatus. Inside the plasma furnace the required gas flow is low so particle entrainment is minimised. The blended feed floats on the melt pool where it is melted by proximity to the DC arc and reacts. The plasma power and feed rate are selected to supply sufficient energy for reactions and to overcome the thermal losses of the process at temperature, as a result of which the iron oxide is partially reduced to iron. About 10% residual iron oxide is left in the slag with the rest acting to self-flux the titanium dioxide slag and hence reduce the melting temperature to 1500*C. Both the titanium dioxide and iron are molten liquids and separation occurs by gravity into distinct layers. The underflow/overflow tap design allows continuous operation while ensuring no feed short circuits the furnace. The liquids can be separately tapped or tapped together and separated afterwards.

The composition of the product slag is shown in Table 1. The slag will be up to 80% $TiO_2$ depending upon the feed impurities. The metal product will be around 90%-95% Fe. Both products have commercial value and secondary wastes are minimised.

TABLE 1

|  | Ilmenite | Slag |
|---|---|---|
| $Na_2O$ | 0.28 | 0.45 |
| MgO | 2.90 | 5.49 |
| $Al_2O_3$ | 2.19 | 6.20 |
| $SiO_2$ | 2.75 | 6.02 |
| CaO | 0.47 | 2.72 |
| $TiO_2$ | 38.08 | 76.28 |
| $Mn_3O_4$ | 0.20 | 0.34 |
| $Cr_2O_3$ | 0.15 | 0.00 |
| $Fe_2O_3$ | 52.40 | 1.97 |
| Total | 100.00 | 100 |

FIG. 2 shows slag product concentration of $TiO_2$ and $Fe_2O_3$ at differing carbon concentrations. The results are derived from the slag analysis of four trials with best fit lines and thermodynamic prediction lines for comparison. It is clear that there is a substantial difference between the theory and the actual trial results. The horizontal distance between the iron oxide lines (for a given FeO concentration) indicate that an extra 35% carbon is required above the thermodynamically predicted levels to reach the desired result, which is common for this process. It is likely that the conditions do not fully reach thermodynamic equilibrium and the separation and mixing mechanisms present in the furnace prevent complete reaction of the carbon. The carbon can sometimes be consumed by segregation and preferential concentration in the metal and separated by gravity to an extent that it results in the reaction regime departing from thermodynamic predictions. These effects are collectively referred to as 'carbon fade'.

It can be clearly observed above that the actual results and predicted results get closer as the carbon blend ratio is increased. This is because the predicted results hit an asymptotic limit which the actual results can catch up with if the reaction is driven to completion by excess carbon. The slag chemical composition at the point of asymptotic limit is determined by the impurities that come from the feed material, reductant and furnace refractory. In these experiments there was some accidental contamination from the refractory as the system was not optimised for the chemistry of the resulting slag system so results were corrected to account for this as shown in FIG. 2.

Example 2

Recycling Stainless Steel Fines/Sludge Wastes Using DC Arc Furnace into a Condition Acceptable for Reuse in the Melt Shop A second example of an application of this invention is in the recycling of stainless steel wastes from steel manufacturing. The manufacture of stainless steel produces by-products such as argon oxygen decarburisation dust (AOD), electric arc furnace dust (EAF), millscale, slurry and mixtures thereof. These wastes contain valuable metal oxides such as chromium, nickel and iron but cannot be directly recycled in the melt shop because of zinc contamination and throughput limitations due to compliance thresholds, carry-over of fine particles and/or water content. Using our invention we are able to pre-treat these wastes into a form acceptable for the melt shop. To demonstrate this, carbon was added to carbothermically reduce the zinc oxide to make it vaporise and separate leaving the clean metal values behind. The feed enters the furnace through the feed system and the water is evaporated in the head space in the presence of the radiative heating. As before the low gas flow rate ensures fine particle carryover into the offgas system is minimised. In the melt pool the zinc oxide is reduced to zinc metal which is evaporated into the off-gas stream and hence separated from the remaining metals. The zinc is then re-oxidized in the post furnace combustion chamber and collected in the bag house. The plasma power and feed rate are selected to supply the correct power for reaction and heat losses. The slag can be separated from the metal by the underflow/overflow tap. The blended material can be continuously overflowed for separation in external refractory lined heated ladles. Additional non-volatile metals like Cr, Ni, Mg and Fe are reduced and recovered as a ferroalloy. This leaves a clean metal layer for re-use in the melt shop and an inert slag phase. Table 2 shows the composition of the process streams in this application of the invention. Table 3 shows the excellent partitioning and recovery efficiencies of elements such as: iron (Fe), chromium (Cr), nickel (Ni) and molybdenum (Mo) in the metal. The typical recovery of these metal values is expected to be enough by themselves to pay for capital and operational costs. Table 2 shows the stream compositions entering and leaving the furnace. Notice how the valuable metals are concentrated into one phase. The technical recovery rates can be increased by adding more power and carbonaceous reductant to the system, however there is often a balance of cost and reward and the example shown is typical of current industrial situations.

TABLE 2

Mass and elemental composition of process streams. The metal elements are present as oxides in the bag house dust and slag streams but as metals in the metal stream.

| Mass/Kg | Feed 1000 | Bag house dust 153 | Slag 260 | Metal 390 |
|---|---|---|---|---|
| C | 1.45% | 0% | 0% | 4.76% |
| Si | 4.61% | 0.60% | 21.87% | 0.05% |
| Cr | 12% | 1.60% | 9.14% | 15.85% |
| Al | 1.1% | 4.70% | 4.06% | 0.00% |
| Ca | 9.97% | 0.70% | 38.32% | 0% |
| Mg | 1.33% | 3.00% | 3.35% | 0% |
| Mn | 2.87% | 1.10% | 7.33% | 1.54% |
| Fe | 35.82% | 4.70% | 2.73% | 65.87% |

TABLE 2-continued

Mass and elemental composition of process streams. The metal elements are present as oxides in the bag house dust and slag streams but as metals in the metal stream.

| Mass/Kg | Feed 1000 | Bag house dust 153 | Slag 260 | Metal 390 |
|---|---|---|---|---|
| Mo | 0.3% | 0.10% | 0.02% | 0.46% |
| Ni | 2.53% | 0.80% | 0.19% | 4.58% |
| Zn | 10.2% | 66.80% | 0% | 0% |
| Cl | 0.1% | 0.60% | 0% | 0% |
| Pb | 0.03% | 0.20% | 0% | 0% |
| Other | 12.13% | 15.10% | 12.34% | 6.86% |
| Total | 100% | 100% | 100% | 100% |

Table 3 shows the partitioning of the element components of the feed across the output streams. Technical recovery rates can be increased higher but not economically.

TABLE 3

Partitioning of elements across the process streams

| | Dust | Slag | Metal | Total |
|---|---|---|---|---|
| Al | 43.06% | 63.21% | | 100% |
| C | 87.41% | | 12.59% | 100% |
| Ca | 1.07% | 99.93% | | 100% |
| Cl | 91.80% | | | 100% |
| Cr | 2.04% | 19.80% | 75.29% | 100% |
| Cu | | | 73.23% | 100% |
| Fe | 2.16% | 2.13% | 99.12% | 100% |
| Mg | 28.42% | 53.93% | | 100% |
| Mn | 5.86% | 66.40% | 27.02% | 100% |
| Mo | 5.10% | 1.73% | 89.72% | 100% |
| Ni | 4.84% | 1.95% | 89.84% | 100% |
| O | 74.62% | 25.38% | | 100% |
| Pb | 102.00% | | | 100% |
| S | | 7.98% | | 100% |
| Si | 1.45% | 89.97% | 0.66% | 100% |
| Ti | | 49.64% | | 100% |
| Zn | 100.20% | | | 100% |
| Other | 19.05% | 26.45% | 22.06% | 100% |

Example 3

Pre-Processing of Ferro-Manganese Metal Sludge Using DC Arc Furnace into a Condition Acceptable for Recycling in a Submerged Arc Furnace An example of the application of this invention is in the preprocessing of ferro-manganese metal sludge into a condition acceptable for recycling in a submerged arc furnace. This invention, unlike a SAF has the ability to safely accept feed material which contains some water. This invention can be used as a preprocessing step for the recovery of wet sludge metal waste streams prior to their use in a SAF. This is of particular use to companies currently operating large SAF, which produce waste streams of valuable metal containing sludge, as landfill costs for waste disposal are rising.

The raw sludge (composition in Table 4) is blended with 20% lime and fed into the DC electric arc furnace. The water vaporizes in the head space in the presence of the radiation heating. In the melt pool the low boiling metals such as zinc, potassium and lead are evaporated into the vapor phase. The lime reduces the viscosity and melting point of the slag, making it easier to process. The composition of the tapped slag is shown in Table 5. The products are then continuously removed through the underflow-overflow tap which prevents the feed short cutting and keeps the furnace gases isolated from the outside air.

TABLE 4

Sludge waste composition used for thermodynamic modelling

| Species | Normalised Comp Average % (w/w) |
|---|---|
| $Al_2O_3$ | 3.663 |
| CaO | 3.730 |
| $Fe_2O_3$ | 1.225 |
| MgO | 4.582 |
| MnO | 40.781 |
| $K_2O$ | 7.458 |
| $SiO_2$ | 29.903 |
| $Na_2O$ | 0.969 |
| Zn | 1.908 |
| Ba | 0.163 |
| B | 0.087 |
| Cd | 0.042 |
| Pb | 0.352 |
| Hg | 0.004 |
| P | 0.056 |
| As | 0.005 |
| C | 3 |
| S | 0.286 |
| $H_2O$ | 2.654 |
| Total | 100 |

TABLE 5

Predicted slag composition

| Species | Normalised Comp Average % (w/w) |
|---|---|
| CaO | 28.0 |
| MgO | 4.3 |
| $SiO_2$ | 26.5 |
| $Al_2O_3$ | 3.3 |
| MnO | 36.5 |
| FeO | 0.5 |
| Total | 99 |

As will be appreciated, the present inventors have provided a system ideally suited for the recovery of useful materials from a particulate metal-containing waste. The feed system and low gas flow rate mean that fine particles can be processed. As a consequence, particle carryover is very low, typically 1%, and complex pretreatments are not required.

This furnace configuration is tolerant to water because it vaporizes in the head space, unlike in a submerged arc furnaces where it can vaporize in the slag layer and cause steam pressurization.

This invention is a single step process for melting, reducing and separation all in the same vessel. The permanent metal pool and conductive hearth, with shielded return electrodes and refractories, prevents the metal alloying with the metallic electrode material for longevity of operation.

Continuous feeding and slag overflow improves material throughput and the design of the overflow tap prevents shortcutting of the feed. In addition, the design of the slag overflow prevents the slag layer moving about vertically in the furnace during continuous operation which improves control and operability. The design of the slag overflow further seals the furnace from atmosphere during continuous overflow operation, which stops CO gas escaping or air ingress.

Concentration and detoxification/cleaning of the feed material/waste occur and the intrinsic material value can be recovered to pay for or off-set the capital and operational costs. Concentration of materials in the slag can allow the slag itself to be a product resulting in close to zero secondary waste.

Unless otherwise stated herein, all percentages are by weight.

Although preferred embodiments of the disclosure have been described herein in detail, it will be understood by those skilled in the art that variations may be made thereto without departing from the scope of the disclosure or of the appended claims.

The invention claimed is:

1. A method for the treatment of metal-containing waste, the method comprising:
    (i) feeding a wet particulate metal-containing waste under gravity into a plasma treatment unit comprising a furnace;
    (ii) plasma treating the particulate metal-containing waste to form a layer of slag and, optionally, a layer of metal beneath the layer of slag; and
    (iii) recovering slag and/or metal from the plasma treatment unit;
    wherein the plasma treatment unit comprises an electrically conductive hearth for holding the layer of slag and optional layer of metal, one or more inlets for the particulate metal-containing waste arranged above the hearth, and a graphite electrode arranged above the hearth so that, in use, a plasma arc is formed between the electrode and the hearth,
    wherein the one or more inlets for the particulate metal-containing waste are arranged adjacent to the electrode and sufficiently close to the electrode so that, in use, the particulate metal-containing waste fed into the plasma treatment unit falls close to the arc formed between the electrode and the hearth and is heated by the plasma arc before contacting the slag layer such that moisture present in the particulate metal-containing waste is completely volatilized in a head space of the furnace above the slag layer;
    wherein the wet particulate metal-containing waste comprises an ore comprising a metal selected from the group consisting of iron, nickel, copper, titanium, chromium, and manganese; and a slag comprising titanium dioxide and metallic iron is recovered from the ore.

2. The method according to claim 1, wherein volatile species present in the metal-containing waste, the slag layer and/or the metal layer are passed to an off-gas system.

3. The method according to claim 1, wherein a reductant material is introduced with the metal-containing waste into the plasma treatment unit.

4. The method according to claim 3, wherein the reductant is a solid reductant.

5. The method according to claim 4, wherein the reductant is a carbonaceous material or a metal oxide.

6. The method according to claim 3, wherein the reductant is a gaseous reductant.

7. The method according to claim 6, wherein the reductant is methane.

8. The method according to claim 3 wherein at least one of the particulate metal-containing waste and the reductant material has an average longest particle diameter of less than 10 mm.

9. The method according to claim 1 further comprising refining the slag to obtain a metal oxide and/or refining the metal to obtain one or more metals or alloys.

10. The method according to claim 1 wherein slag is recovered from the slag layer through an outlet upwardly inclined from the hearth wall and located below the surface of the slag layer.

11. The method according to claim 1, wherein the method is a continuous process and wherein the slag is allowed to continuously overflow from the plasma treatment unit.

12. The method according to claim 1, wherein the particulate metal-containing waste comprises waste dust, mine tailings or powdered ore.

13. The method according to claim 1, wherein at least a portion of the slag recovered from the slag layer is ground and recycled into the plasma treatment unit.

14. The method according to claim 1, wherein the particulate metal-containing waste is gravity fed into the plasma treatment unit.

15. The method according to claim 1, wherein the plasma treatment is carried out:
    (i) at a temperature of from 1400 to 2500° C.; and/or
    (ii) in an oxygen depleted atmosphere.

16. The method according to claim 1, wherein the hearth is:
    (a) indirectly water-cooled; and/or
    (b) formed of a refractory material.

17. The method according to claim 1, wherein during plasma treatment an amount of molten metal is maintained in contact with the hearth.

18. The method according to claim 1, wherein the particulate metal-containing waste is in the form of a sludge.

19. The method according to claim 1 wherein said plasma arc extends between said graphite electrode within said head space and said hearth.

20. The method according to claim 1 wherein the plasma gas flow is low so that no more than 2 weight percent of the particulate feed material is entrained in off-gas from the plasma treatment unit.

21. The method according to claim 20 wherein the particle size of the particulate metal-containing waste is less than 1 mm.

22. The method according to claim 1 wherein said hearth comprises a counter-electrode for said plasma arc.

23. The method according to claim 1 wherein the slag is recycled to the plasma treatment unit for recovery of a metal layer comprising a metal contained in the recycled slag.

24. A method for the treatment of metal-containing waste, the method comprising:
    (i) feeding a wet particulate metal-containing waste under gravity into a plasma treatment unit comprising a furnace;
    (ii) plasma treating the particulate metal-containing waste to form a layer of slag and, optionally, a layer of metal beneath the layer of slag; and
    (iii) recovering slag and/or metal from the plasma treatment unit;
    wherein the plasma treatment unit comprises an electrically conductive hearth for holding the layer of slag and optional layer of metal, one or more inlets for the particulate metal-containing waste arranged above the hearth, and a graphite electrode arranged above the hearth so that, in use, a plasma arc is formed between the electrode and the hearth,
    wherein the one or more inlets for the particulate metal-containing waste are arranged adjacent to the electrode and sufficiently close to the electrode so that, in use, the particulate metal-containing waste fed into the plasma treatment unit falls close to the arc formed between the electrode and the hearth and is heated by the plasma arc before contacting the slag layer such that moisture present in the particulate metal-containing waste is completely volatilized in a head space of the furnace above the slag layer;

wherein said wet particulate waste comprises stainless steel wastes from steel manufacturing, said slag comprises silicon, chromium, and calcium and a layer of metal is recovered comprising chromium, iron and nickel.

25. A method for the treatment of metal-containing waste, the method comprising:
(i) feeding a wet particulate metal-containing waste under gravity into a plasma treatment unit comprising a furnace;
(ii) plasma treating the particulate metal-containing waste to form a layer of slag and, optionally, a layer of metal beneath the layer of slag; and
(iii) recovering slag and/or metal from the plasma treatment unit;
wherein the plasma treatment unit comprises an electrically conductive hearth for holding the layer of slag and optional layer of metal, one or more inlets for the particulate metal-containing waste arranged above the hearth, and a graphite electrode arranged above the hearth so that, in use, a plasma arc is formed between the electrode and the hearth,
wherein the one or more inlets for the particulate metal-containing waste are arranged adjacent to the electrode and sufficiently close to the electrode so that, in use, the particulate metal-containing waste fed into the plasma treatment unit falls close to the arc formed between the electrode and the hearth and is heated by the plasma arc before contacting the slag layer such that moisture present in the particulate metal-containing waste is completely volatilized in a head space of the furnace above the slag layer;
wherein said wet particulate waste comprises a ferromanganese metal sludge comprising manganese oxide, silicon dioxide and calcium oxide.

\* \* \* \* \*